Figure 1:
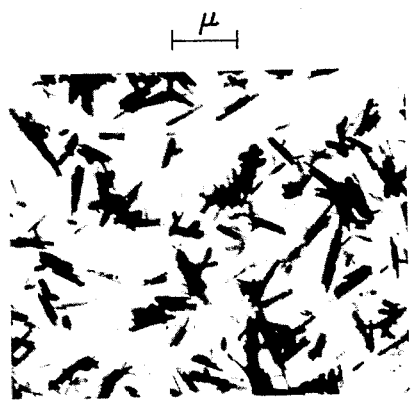

United States Patent [19]

Otsuki et al.

[11] 4,073,878
[45] Feb. 14, 1978

[54] METHOD FOR PRODUCING YELLOW HYDRATED FERRIC OXIDE

[76] Inventors: Tatsukiyo Otsuki, 9-25, Saiwaicho; Sinya Takata, 401, Nishikawahara, both of Okayama, Japan

[21] Appl. No.: 611,642

[22] Filed: Sept. 9, 1975

[51] Int. Cl.² ............................................. C01G 49/02
[52] U.S. Cl. ................................................... 423/633
[58] Field of Search ......... 423/633, 634, 140, DIG. 1, 423/DIG. 2

[56] References Cited

U.S. PATENT DOCUMENTS 3,845,198  10/1974  Marcot .................................. 423/634
3,970,738  7/1976   Matsui et al. ......................... 423/634

FOREIGN PATENT DOCUMENTS 1,249,241  9/1967  Germany ............................. 423/634

Primary Examiner—O. R. Vertiz
Assistant Examiner—Wayne A. Langel
Attorney, Agent, or Firm—Armstrong, Nikaido & Marmelstein

[57] ABSTRACT

Yellow hydrated ferric oxide having uniform and proper particle size can be economically produced by the present invention which comprises allowing an ammonium salt to be present in a given concentration in a ferrous salt solution, partially neutralizing the mixed solution with ammonia, oxidizing it with air to obtain a seed liquid, adding a ferrous salt solution to said seed liquid and simultaneously adding ammonia thereto to attain a suitable pH value and oxidizing the ferrous salt with air at said pH whereby a uniform particle size can be rapidly obtained.

7 Claims, 4 Drawing Figures

METHOD FOR PRODUCING YELLOW HYDRATED FERRIC OXIDE

The present invention relates to a method for economically producing yellow hydrated ferric oxide from a ferrous salt solution and more specifically it concerns with a method for rapidly producing yellow hydrated ferric oxide having a uniform and proper particle size by partially neutralizing the ferrous salt with ammonia and then oxidizing it with air.

The yellow hydrated ferric oxide is an α-hydrated ferric oxide which is generally expressed as α-FeOOH, is in the form of acicular particle in appearance and is widely used as a yellow pigment or a raw material for magnetic materials.

Various methods have been proposed for producing α-hydrated ferric oxide, for example, (1) a method according to which a seed is dispersed in an aqueous solution of a ferrous salt and then this is neutralized with an alkali while being oxidized, (2) a method according to which an aqueous solution of a ferric salt is hydrolized while being neutralized with an alkali, (3) a method according to which a seed is dispersed in an aqueous solution of a ferrous salt and this is neutralized with metallic iron while blowing air thereinto.

Use of α-hydrated ferric oxide as a raw material for magnetic material and as a yellow pigment requires that it is in the form of acicular particle and moreover the particle has proper and uniform size. Only the known method (3) mentioned above can produce the α-hydrated ferric oxide which satisfies said requirements and according to the known methods (1) and (2) it is very difficult to grow the particle to the desired size and to make the particle size uniform. Conventionally, α-hydrated ferric oxide has been mostly produced by the method (3). According to this method, however, in order to make the particle size uniform, fine acicular particle is separately prepared and this is dispersed in an aqueous solution of a ferrous salt, which is then gradually oxidized by blowing air thereinto, neutralized with a moderate neutralizing agent such as metallic iron and the reaction is stopped when the particle grows to a proper size. Thus, in the case of such method, there are the following defects; an excessively large amount of alkali is required for preparation of the seed; a complicated step of separating the seed from seed liquid and of washing the seed is required; since the reaction for growing the particle must be extremely slowly carried out, a considerably long time is required and a production plant of a large capacity is also required.

These defects of the known method as enumerated above can be overcome by the present method which comprises allowing an ammonium salt to be present in a given concentration in a ferrous salt solution, partially neutralizing it with ammonia, oxidizing it with air to produce particle which is proper as a seed, adding an aqueous solution of ferrous salt to said seed liquid and simultaneously adding ammonia thereto to maintain a suitable pH value and oxidizing the ferrous salt with air at said pH whereby it is rapidly grown to a uniform particle size. That is, the present invention is based on the discovery that when an ammonium salt is allowed to coexist in the reaction liquid before the reaction takes place, production of seed becomes easy and growth of particle becomes rapid and can be uniformly adjusted. Thus, the object of the present invention is to provide a method for industrially easily and economically producing yellow hydrated ferric oxide.

Figure 2:
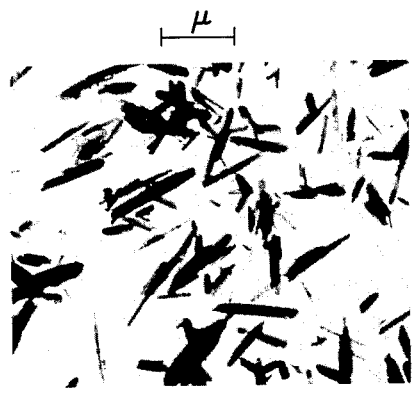
Figure 3:
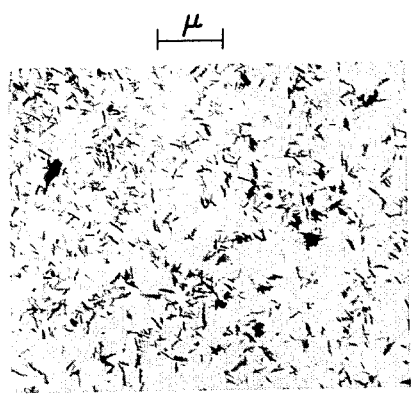
Figure 4:
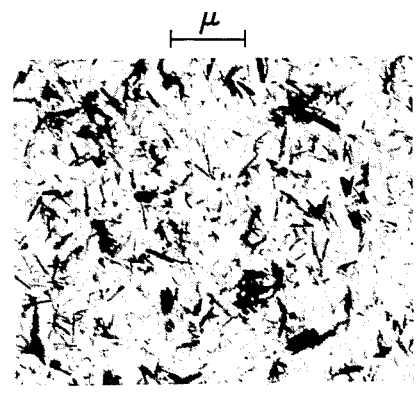

FIGS. 1 and 2 are electron micrographs of yellow hydrated ferric oxide obtained by neutralization and oxidation of ferrous sulfate solution and ferrous chloride solution under the coexistence of an ammonium salt in accordance with the present invention and FIGS. 3 and 4 are electron micrographs of hydrated ferric oxide obtained by neutralization and oxidation of ferrous sulfate solution and ferrous chloride solution without addition of ammonium salt before the reaction.

Solutions of ferrous salts such as ferrous sulfate, ferrous chloride, pickling waste liquors of iron, etc. in a high concentration can be widely used in the present invention.

Suitable conditions for working the present invention will be explained below.

An aqueous solution of a ferrous salt is diluted with an ammonium salt solution to adjust the $Fe^{++}$ concentration to at least 10 g/l, preferably 20 – 40 g/l, the $NH_4^+$ concentration to at least 30 g/l, preferably 50 – 70 g/l and ammonium salt concentration to preferably about 150 – 200 g/l. As the ammonium salt solution to be used for dilution, it is econimical to repeatedly use a final reaction solution from which α-hydrated ferric oxide is separated. To thus diluted solution is added ammonia gas or ammonia water to partially neutralize the ferrous salt so that about 5 – 20 g/l, preferably about 10 g/l of Fe is precipitated as ferrous hydroxide, into which air is blown to completely oxidize the ferrous hydroxide. This reaction is carried out at a temperature of 25° – 40° C and good fine acicular seed of α-hydrated ferric oxide can be easily obtained. Subsequently, to thus obtained seed liquid is added a concentrated solution of a ferrous salt having a concentration of at least 30 g/l, preferably 70 – 80 g/l at a rate of 3 – 10 kg(Fe)/hr/m³ (seed liquid), preferably 5 – 6 kg/hr/m³. Then, ammonia, air and a small amount of nitrogen oxide are blown thereinto to adjust the pH to 4.0 – 6.5 and the temperature is made to 45° – 60° C in order that concentration of $Fe^{++}$ remaining at completion of formation of the seed can be maintained as it is. When iron content of 3 – 10 times, preferably 3 – 5 times the amount of the seed has been supplied, addition of the ferrous salt solution is discontinued and the neutralization and oxidation at the same treating rate are continued until nearly no $Fe^{++}$ remains and then the reaction is completed. Said nitrogen oxide blown into together with air is an oxidation catalyst for acceleration of oxidation rate. When the amount of the ammonium salt present in formation of the seed and in growth of particle is small, growth in the lengthwise direction difficultly proceeds and growth in the width direction proceeds to result in hydrated ferric oxide of a low acicular degree. When no ammonium salt is present at the initiation of the reaction, it is difficult to form fine acicular seed in the reaction of seed formation. Moreover, in the growth reaction of particle, too, when a seed liquid in which no ammonium salt is present is subjected to reaction, not only growth of the particle in the acicular direction does not proceed, as shown in FIGS. 3 and 4, but also hydrated ferric oxides of various shapes are produced and clear yellow α-hydrated ferric oxide cannot be produced. Furthermore, according to the method of the present invention, it is possible to conduct uniform particle growth at a growth speed of 3 – 10 kg(Fe)/hr/m³ (seed liquid) while according to the conventional methods, the growth speed is 0.1 – 0.3 kg(Fe)/hr/m³. Thus, capacity of reaction apparatus can be greatly reduced. When sodium hydroxide is used as the neutralizing agent, particle growth proceeds with difficulty and α-hydrated ferric oxide of good quality cannot be obtained.

As explained above, according to the method of the present invention, α-hydrated ferric oxide of uniform particle size and of clear yellow can be produced. Therefore, the present invention can be projected as a device for treating a pickling waste liquor of iron. Thus, both of prevention of environmental contamination and recovery of product can be realized.

The present invention will be further illustrated in the following Examples.

EXAMPLE 1

8.0l of sulfuric acid pickling waste liquor of irons which contained 80 g/l of $Fe^{++}$ was introduced into a 50l-reaction tank with a stirrer, to which 13.5l of ammonium sulfate solution having a concentration of 320 g/l was added to dilute the $Fe^{++}$ concentration to 30 g/l. The concentration of ammonium sulfate at this time was 200 g/l. This mixed solution was kept at 35° C and ammonia gas was added to said solution while stirring to precipitate ferrous hydroxide until the $Fe^{++}$ concentration reached 20 g/l. Subsequently, air was blown thereinto at a rate of 1200 l/hr to completely oxidize ferrous hydroxide in 3.5 hours. The pH value before the oxidation was 7.2 and the pH value at the completion of the oxidation was 5.9. At the time of the completion of oxidation, the precipitate had light greenish yellow color and was fine acicular α-hydrated ferric oxide. Temperature of this seed liquid was elevated to 60° C and said ferrous salt solution ($Fe^{++}$ concentration 80 g/l) was supplied to said liquid for 10 hours at a rate of 2.0 l/hr while blowing thereinto air at a rate of 1200 l/hr and nitrogen oxide at a rate of 12 l/hr, during which ammonia gas was supplied so that 20 g/l of $Fe^{++}$ always remained in the reaction liquid and pH of the liquid was 6.0. After discontinuing the supply of the ferrous salt solution, 20 g/l of $Fe^{++}$ which remained in the reaction liquid was successively neutralized and oxidized in 3.0 hours to make the $Fe^{++}$ concentration nearly zero.

By said reaction, the seed which was initially light greenish yellow was changed to show clear yellow color. This was dehydrated and dried and observed by an electron microscope to find that uniform acicular α-hydrated ferric oxide of about 0.1 μ in width and about 0.6 μ in length was obtained as shown in FIG. 1.

EXAMPLE 2

5l of hydrochloric acid pickling waste liquor containing 110 g/l of $Fe^{++}$ was introduced into a reaction tank and 13.3l of ammonium chloride solution having a concentration of 250 g/l was added thereto to obtain a $Fe^{++}$ concentration of 30 g/l. Concentration of ammonium chloride at this time was 180 g/l. Ammonia gas was added to said mixed solution kept at 25° C while stirring to produce ferrous hydroxide until the $Fe^{++}$ concentration reached 20 g/l and then air was blown thereinto at a rate of 1200 l/hr to completely oxidize the ferrous hydroxide in 3 hours. PH value before the oxidation was 6.7 and that after the oxidation was 5.3. Precipitate at the time of completion of the oxidation had light greenish yellow color and was fine acicular α-hydrated ferric oxide. This seed liquid was heated to 60° C as it was and then said ferrous salt solution (Fe 110 g/l) was supplied thereto at a rate of 0.5 l/hr for 10 hours while blowing thereinto air at 1200 l/hr and nitrogen oxide at 6 l/hr, during which ammonia gas was supplied so that 20 g/l of $Fe^{++}$ always remained in the reaction solution and the pH value was kept at 5.0. After supply of the ferrous salt solution was discontinued, 20 g/l of $Fe^{++}$ remaining in the reaction solution was successively neutralized and oxidized in 2.5 hours to make the $Fe^{++}$ concentration nearly zero. By this reaction, color of the seed which was initially light greenish yellow changed to clear yellow. The product was dehydrated and dried and was observed by an electron microscope to fine that uniform needle-like hydrated ferric oxide of about 0.1 μ in width and about 0.6 μ in length was produced.

What is claimed is:

1. A method for producing yellow hydrated ferric oxide which comprises
   (a) forming a mixed solution containing ammonium salt and ferrous salt, wherein the ammonium ion concentration of the solution is at least 30 g/l,
   (b) adding ammonia to partially neutralize the solution and oxidizing the solution with air to obtain a seed liquid, the temperature of the solution being maintained within a range of from 25° - 40° C,
   (c) adding continuously a ferrous salt solution to the seed liquid,
   (d) neutralizing the resulting solution with ammonia to maintain the pH of the solution in the range of 4.0 - 6.5 and oxidizing the solution with air to form yellow hydrated ferric oxide, the neutralizing and oxidizing being conducted simultaneously while maintaining the solution at a temperature within a range of from 45° - 60° C, and
   (e) recovering the resulting yellow hydrated ferric oxide.

2. A method according to claim 1, wherein $Fe^{++}$ concentration in the mixed solution is at least 10 g/l.

3. A method according to claim 1, wherein the partial neutralization is carried out so that 5 - 20 g/l of Fe is precipitated as ferrous hydroxide.

4. A method according to claim 1, wherein the addition of the ferrous salt solution to the seed liquid is carried out at a rate of 3 - 10 kg(Fe)/hr/m³ (seed liquid).

5. A method according to claim 1, wherein the amount of the ferrous salt added to the seed liquid is 3 - 10 times the amount of the seed.

6. A method according to claim 1, wherein the ammonium ion concentration in the mixed solution is 50 - 70 g/l.

7. A method according to claim 1, wherein $Fe^{++}$ concentration in the mixed solution is 20 - 40 g/l.

* * * * *